(12) United States Patent
Kuniba

(10) Patent No.: US 7,092,577 B2
(45) Date of Patent: Aug. 15, 2006

(54) IMAGE COMPRESSION DEVICE, IMAGE COMPRESSION METHOD, ELECTRONIC CAMERA, COMPUTER-READABLE MEDIUM FOR IMAGE COMPRESSION, AND COMPUTER SYSTEM FOR COMPRESSING IMAGE DATA

(75) Inventor: Hideyasu Kuniba, Tokyo (JP)

(73) Assignee: Nikon Corporation, Tokyo (JP)

( * ) Notice: Subject to any disclaimer, the term of this patent is extended or adjusted under 35 U.S.C. 154(b) by 680 days.

(21) Appl. No.: 10/120,843

(22) Filed: Apr. 12, 2002

(65) Prior Publication Data

US 2002/0181791 A1 Dec. 5, 2002

(30) Foreign Application Priority Data

Apr. 12, 2001 (JP) ............................. 2001-113618

(51) Int. Cl.
*G06K 9/00* (2006.01)
*G06K 9/36* (2006.01)

(52) U.S. Cl. ...................... 382/239; 382/166; 382/232; 382/251

(58) Field of Classification Search ................ 382/162, 382/166, 167, 239–240, 276–282, 231, 251; 358/516–520, 539; 375/240.18, 240.19; 348/207.99, 398.1, 408.1
See application file for complete search history.

(56) References Cited

U.S. PATENT DOCUMENTS

| 5,517,581 | A |   | 5/1996 | Johnston et al. ............ 382/232 |
| 5,717,791 | A |   | 2/1998 | Labaere et al. ............. 382/274 |
| 5,754,793 | A |   | 5/1998 | Eom et al. .................. 358/463 |
| 5,845,011 | A | * | 12/1998 | Miyamoto et al. .......... 382/232 |
| 5,907,642 | A |   | 5/1999 | Ito ............................. 382/302 |
| 6,049,630 | A | * | 4/2000 | Wang et al. ................. 382/239 |

* cited by examiner

*Primary Examiner*—Duy M. Dang
(74) *Attorney, Agent, or Firm*—Morgan, Lewis & Bockius, LLP

(57) ABSTRACT

An image compression device includes a transformation part for subjecting image data to frequency decomposition and for determining transformation coefficients, a coefficient adjustment part for altering the transformation coefficients according to imaging conditions for obtaining the image data, and an encoding part for encoding the altered transformation coefficients.

46 Claims, 8 Drawing Sheets

IMAGE COMPRESSION DEVICE, IMAGE COMPRESSION METHOD, ELECTRONIC CAMERA, COMPUTER-READABLE MEDIUM FOR IMAGE COMPRESSION, AND COMPUTER SYSTEM FOR COMPRESSING IMAGE DATA

The present invention claims the benefit of Japanese Patent Application No. 2001-113618 filed in Japan on Apr. 12, 2001, which is hereby incorporated by reference.

BACKGROUND OF THE INVENTION

1. Field of The Invention

The present invention relates to an image compression device, and more particularly, to an image compression device that subjects image data to image compression.

The present invention also relates to an image compression method, and more particularly, to an image compression method that subjects image data to image compression.

The present invention also relates to an electronic camera, and more particularly, to an electronic camera in which an image compression device is mounted.

The present invention also relates to a computer-readable medium for image compression, and more particularly, to a computer-readable medium for image compression that may be used to cause a computer to function as an image compression device.

The present invention also relates to a computer system, and more particularly, to a computer system for compressing image data.

2. Discussion of The Related Art

Currently, a JPEG2000 compressed image file is produced by an encoding procedure, wherein an input image is subjected to color coordinate transformation and then the input image is divided into a plurality of rectangular areas (tile images) as necessary, and each of the tile images undergoes encoding processing. During the encoding process, the tile images undergo wavelet transformation, quantization, bit modeling, region of interest (ROI) encoding, and arithmetical encoding, thereby generating encoded data.

FIG. 9 is a diagram showing a decomposition of image data into sub-bands by repetitive wavelet transformation. During wavelet transformation, the tile images are subjected to a discrete wavelet transformation in vertical and horizontal directions, such that the tile images are decomposed by frequency into a plurality of sub-bands (1LL, 1LH 1HL, and 1HH). Among these sub-bands, 1LL, which contains a direct current component, is subjected to a further discrete wavelet transformation, and is decomposed by frequency into a plurality of further sub-bands (2LL, 2LH, 2HL, 2HH).

During quantization, the wavelet transformation coefficients are quantized to a quantization step width that is determined for each sub-band. Moreover, during a lossy/lossless unified processing, the quantization step is set as a "1." During lossy compression, lower N bit planes are discarded during a subsequent discarding process. The discarding process is equivalent to a quantization step of "Nth power of 2."

Following the quantization step, the wavelet transformation coefficients are divided into encoding blocks of a fixed size such as 64 ×64, for example, within each of the sub-bands. The transformation coefficients within each encoding block are divided into sign bits and absolute values; then the absolute values are distributed among a natural binary number of bit planes. The bit planes thus constructed are encoded via three types of encoding passes such as significance pass, refinement pass and cleanup pass, for example, in order from the upper bit planes. Furthermore, the sign bits are encoded immediately after the uppermost bits of the corresponding absolute values appear in the bit plane.

The ROI encoding is a function that increases the decoded image quality of selected regions on the tile images by preferentially assigning amounts of information to the selected regions. In other words, the quantized transformation coefficients positioned in selected regions are shifted upward by S bits. As a result, the selected regions are shifted to higher bit planes, and are preferentially encoded over any bits in the non-selected regions. Furthermore, in the case of a max shift method, the bit shift number S is set at a value that is greater than the number of places of the uppermost bits of the non-selected regions. As a result, the non-zero transformation coefficients of the selected regions are always values that are equal to or greater than "2 to the power of S." Accordingly, at the time of decoding, the transformation coefficients of the selected regions can easily be restored by selectively shifting downward any quantized values that are equal to or greater than "2 to the power of S."

During arithmetical encoding, the encoded data is further subjected to arithmetical encoding by an MQ coder.

After the encoding process is completed, a bit stream is formed by arranging the encoded data of respective tile images in a specified order, such as SNR progressive, for example.

In general, in the case of image data, the space frequency distribution and amount of noise vary sharply according to settings of an electronic camera during imaging and to differences in the imaging environment. However, in conventional image compression processing, the same image compression processing is performed for all data even in the case of image data obtained under different imaging conditions. As a result, in the case of image data that is acquired under imaging conditions that differ from ordinary conditions, it is difficult to distribute effective information among the transformation coefficients of the respective sub-bands in accordance with amounts of noise that differ from the ordinary amounts of noise, so that the image deterioration that accompanies image compression processing tends to increase. Furthermore, image data that is acquired under imaging conditions that differ from ordinary conditions tends to suffer from problems in terms of image quality such as noise, for example, that is inherently conspicuous.

SUMMARY OF THE INVENTION

Accordingly, the present invention is directed to a image compression device, an image compression program, and an electronic camera that substantially obviates one or more of the problems due to limitations and disadvantages of the related art.

An object of the present invention is to provide an image compression device, image compression method, and electronic camera device for realized appropriate image compression by effectively utilizing information regarding conditions during imaging of image data during image compression.

Another object of the present invention is to provide a computer-readable medium that may be used to cause a computer to function as an image compression device.

Another object of the present invention is to provide a computer system for compressing image data.

Additional features and advantages of the invention will be set forth in the description which follows, and in part will be apparent from the description, or may be learned by practice of the invention The objectives and other advantages of the invention will be realized and attained by the structure particularly pointed out in the written description and claims hereof as well as the appended drawings.

To achieve these and other advantages and in accordance with the purpose of the present invention, as embodied and broadly described, an image compression device includes a transformation part for subjecting image data to frequency decomposition and for determining transformation coefficients, a coefficient adjustment part for altering the transformation coefficients according to imaging conditions for obtaining the image data, and an encoding part for encoding the altered transformation coefficients.

In another aspect, a method for image compression includes the steps of subjecting image data to frequency decomposition and for determining transformation coefficients, altering the transformation coefficients according to imaging conditions for obtaining the image data, and encoding the altered transformation coefficients.

In another aspect, an electronic camera device includes an image compression device, and an imaging part for producing image data by imaging an object of imaging, wherein the image compression device acquires information regarding imaging conditions of the imaging part, and subjects the image data to image compression according to the acquired information.

In another aspect, a computer-readable medium having a computer program with functions for image compression includes performing the steps of subjecting image data under specified imaging conditions to a frequency decomposition to determine transformation coefficients, altering values of the transformation coefficients in accordance with information regarding the imaging conditions to determine altered values, and encoding the altered values.

In another aspect, a computer system for compressing image data includes a computer program for image compression, comprising a plurality of processing components for subjecting image data under specified imaging conditions to a frequency decomposition to determine transformation coefficients, for altering values of the transformation coefficients in accordance with information regarding the imaging conditions to determine altered values; and for encoding the altered values.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
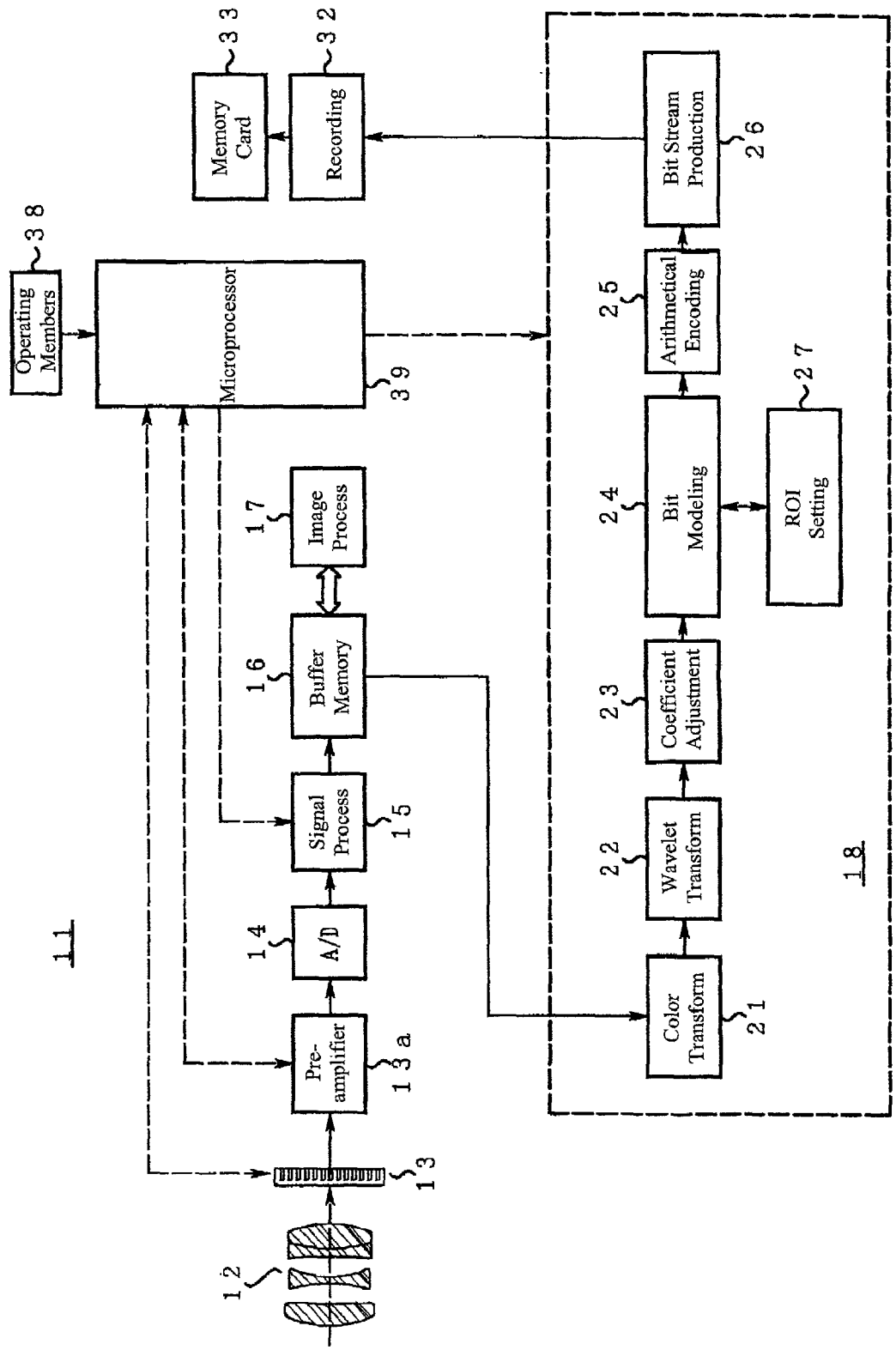
FIG. 1 is a diagram that shows an exemplary electronic camera according to the present invention.

FIG. 1 is a diagram that shows an exemplary electronic camera according to the present invention. In FIG. 1, an imaging lens 12 may be mounted in an electronic camera 11, and a light-receiving surface of an imaging element 13 may be disposed in an image space of the imaging lens 12. Output of the imaging element 13 may be processed via a pre-amplifier 13a, an AD converter part 14, and a signal processing part 15, and recorded in a buffer memory 16. Connected to a data bus of the buffer memory are an image processing part 17 and an image compression part 18. The image compression part 18 may be equipped with a color transformation part 21, a wavelet transformation part 22, a coefficient adjustment part 23, a bit modeling part 24, an arithmetical encoding part 25, a bit stream production part 27, and a region of interest (ROI) setting part 27. A compressed file produced in the image compression part 18 may be sent to a recording part 32 that records and stores the compressed file on a memory card 33. Furthermore, installed within a housing body of the electronic camera are operating members 38 that may comprise a release button and mode setting button, for example. Output signals of the operating members 38 may be sent to a microprocessor 39 that may be installed inside the electronic camera 11. The microprocessor 39 may provide for system control via signal lines of the electronic camera 11, the imaging element 13, the pre-amplifier 13a, the signal processing part 15, and the image compression part 18, for example.

For example, control pulses used for electronic shutter control and image read-out may be sent to the imaging element 13 from the microprocessor 39. Furthermore, temperature information received from a temperature sensor (not shown) on the imaging element 13 may be transmitted to the microprocessor 39 from the imaging element 13.

Operation of the electronic camera 11 may involve signal processing operations including release half-pressing and release full-pressing operations, for example. When the release half-pressing operation is performed by the user, the microprocessor 39 may perform an exposure calculation based upon a measured light value from a light measuring part (not shown), and determine an appropriate exposure time and imaging sensitivity for the imaging element 13. When the release full-pressing operation is performed by the user, the microprocessor 39 may initiate an exposure operation by resetting (discharging) unnecessary charge from the imaging element 13.

When a predetermined exposure time has elapsed during the release full-pressing operation, the microprocessor 39 may drive the imaging element 13 so that analog image data for the object of imaging is successively read out. Then, the analog image data may be input into the pre-amplifier 13a. The pre-amplifier 13a may amplify the analog image data in accordance with a signal gain that corresponds to the imaging sensitivity determined during the release half-pressing operation. After direct-current clamping the amplified analog image data, the pre-amplifier 13a may output the analog image data to the AD converter part 14. The AD converter part 14 may subject the analog image data to an A/D conversion, thereby converting the analog image data into digitized image data.

The signal processing part 15 may perform black level correction and gamma correction to the digitized image data. The gamma correction may be performed based upon a gamma correction curve selected by the microprocessor 39 resulting from user settings or an image histogram. The corrected digitized image data resulting from the signal processing operations may be temporarily stored in the buffer memory 16.

The image processing part 17 may perform color interpolation processing on the image data temporarily stored in the buffer memory 16. The image compression part 18 may read out the color interpolation processed image data from the buffer memory 16, and perform image compression processing. The recording part 32 may acquires compressed file data from the image compression part 18 following image compression, and may record and store the compressed file data in the memory card 33.

Accordingly, the imaging operation, image processing operation and image recording operation of the electronic camera 11 may be complete.

Figure 2:
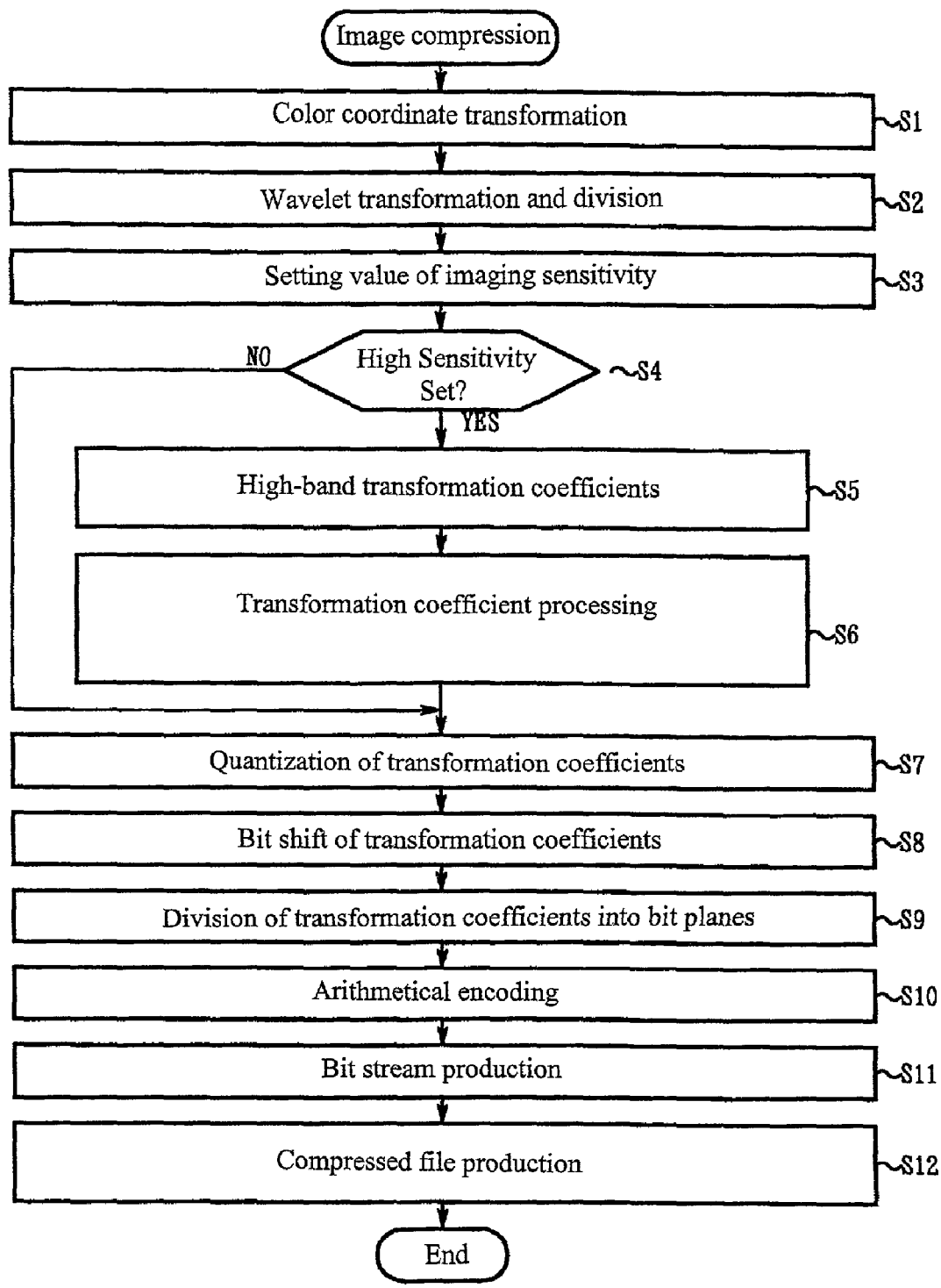
FIG. 2 is a flow chart showing an exemplary image compression processing according to the present invention.

FIG. 2 is a flow chart showing an exemplary image compression processing according to the present invention. In FIG. 2, Step S1 includes color transformation of image data, wherein the color transformation part 21 may successively read out the image data from the buffer memo processing units. The color transformation part 21 may perform a color coordinate transformation of the image data, and transform the data into color components such as YcbCr, for example.

Figure 9:
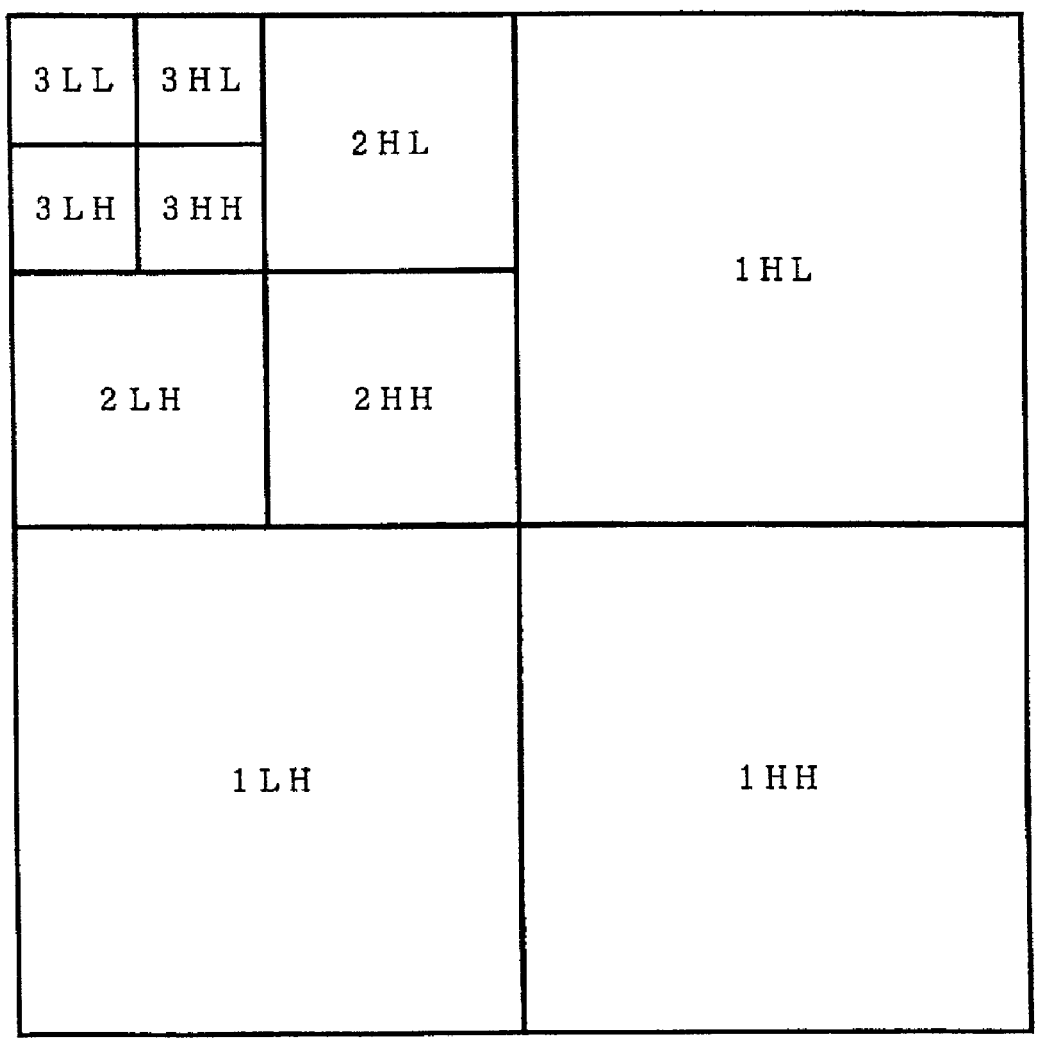
FIG. 9 is a diagram showing image data decomposed into sub-bands by wavelet transformation according to the related art.

In Step S2, a wavelet transformation part 22 performs a wavelet transformation into color component units, thereby generating a frequency decomposition into sub-band components,as shown in FIG. 9.

In Step S3, a coefficient adjustment part 23 acquires information from the microprocessor 39 regarding imaging sensitivity at an image data acquisition time.

In Step S4, a coefficient adjustment part 23 determines if the imaging sensitivity is equal to or greater than a threshold value. In cases where the imaging sensitivity is equal to or greater than the threshold value, the coefficient adjustment part 23 may shift the processing operation to Step S5. Conversely, in cases where the imaging sensitivity is less than the threshold value, the coefficient adjustment part 23 may shift the processing operation to Step S7.

In Step S5, image data is acquired at a high sensitivity setting. As a result, an overall signal charge that is accumulated within the imaging element 13 may be relatively small, wherein a S/N ratio of the image data may be relatively low as compared to image data acquired under ordinary imaging conditions. Accordingly, in high sub-bands of color difference components CbCr (sub-bands excluding 3LL), the coefficient adjustment part 23 may replace the high-band transformation coefficients whose absolute values are equal to or less than a specified value with values that are substantially zero. Furthermore, it may be desirable that the specified amplitude used for the color difference components be set with regard to a balance between an ameliorating effect on color noise and color running at color boundaries.

In Step S6, in the high sub-band of a brightness component Y (1HH), the coefficient adjustment part 23 may replace the high-band transformation coefficients whose amplitude is equal to or less than a specified amplitude with values that are substantially zero. Furthermore, in regard to the specified amplitude that is used for the brightness component, it may be desirable that the amplitude be set with regard to a balance between the ameliorating effect on image noise and the deterioration in sharpness along a diagonal direction. The 1HH sub-band region may be a space frequency component that is not correlated with horizontal or vertical orientations of the image. Consequently, random noise components may be especially concentrated within the region. Accordingly, by setting the 1HH component at substantially zero, a high noise ameliorating effect may be obtained.

In addition, the coefficient adjustment part 23 may multiply the high-band transformation coefficients of the high sub-bands (1HL, 1LH) of the brightness component Y by a factor of 0.5. The 1HL and 1LH sub-band regions may have a correlation with the vertical or horizontal direction of the image such that a high possibility exists that they are signal components of the image. Accordingly, by allowing the 1HL and 1LH components to remain, it may be possible to preserve image structures such as horizontal edges and vertical edges in an appropriate manner. Furthermore, the coefficient adjustment part 23 may reinforce the transformation coefficients of the intermediate sub-bands (2HL, 2LH, 2HH) of the brightness component Y by a factor of 1.5. As a result, it may be possible to compensate for a decrease in a sharpness of the image data that accompanies noise removal.

In Step S7, the coefficient adjustment part 23 may quantize the transformation coefficients, as necessary.

In Step S8, a bit modeling part 24 may read out a mask image of a selected region that is preset in the ROI setting part 27. Based upon the mask image of the selected region, the bit modeling part 24 may make a determination for each sub-band as to whether or not the transformation coefficients are included in the selected region. In the case of transformation coefficients that are positioned within the selected region, the bit modeling part 24 may shift the transformation coefficients upward by an S-number of bits. Furthermore, the S-number of bits may be determined according to a max shift method.

In Step S9, the bit modeling part 24 may divide the transformation coefficients into bit planes. Accordingly, the transformation coefficients of the selected region may be relegated to upper bit planes. The bit modeling part 24 may perform three types of encoding passes in order from the uppermost bit plane.

In Step S10, an arithmetical encoding part 25 may acquire encoded data from the bit modeling part 24. The arithmetical encoding part 25 may perform arithmetical encoding on the encoded data using an MQ coder, for example, which is a two-value arithmetical code.

In Step S11, a bit stream production part 26 may rearrange the encoded data into SNR progressive order, for example, or some other preferential order, and produce a bit stream.

In Step S12, the bit stream production part 26 may create compressed files by cutting the bit stream such that the bit stream is accommodated into a target file size.

As a result of the Steps S1–S12, the exemplary image compression processing according to the present invention is complete.

Figure 3A:
FIG. 3A shows an original image according to the present invention.
Figure 3B:
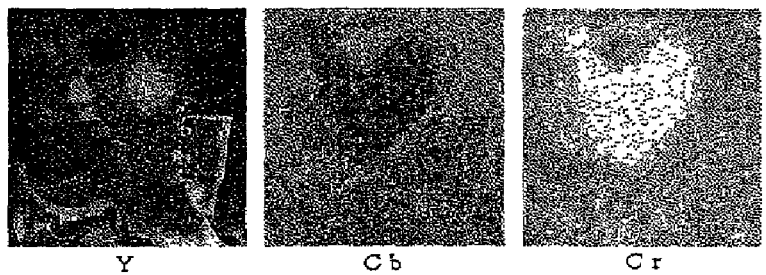
FIG. 3B shows images obtained by decomposing the original image into YCbCr color components.

FIG. 3A shows an original image according to the present invention. FIG. 3B shows images obtained by decomposing the original image into YCbCr color components. In FIG. 3A, image data ("original image") is acquired at a relatively high imaging sensitivity. In a dark portion on the left side of the image, there appears numerous instances of noise ("color spot noise") that results from mixing of magenta and green colors in spot form. In FIG. 3B, an image is obtained by decomposing the original image into YCbCr color components. The color spot noise of the original image appears mainly in the color difference components CbCr.

Figure 4A:
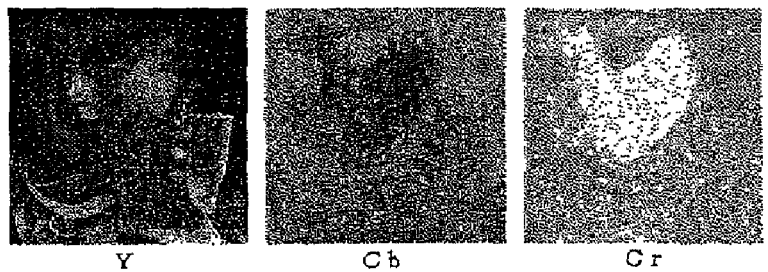
FIGS. 4A and 4B show an effect of reduction processing of color difference components according to the present invention.
Figure 4B:

FIGS. 4A and 4B show an effect of reduction processing of color difference components according to the present invention. FIG. 4A shows images in which all of the high-band transformation coefficients of the color difference components CbCr (transformation coefficients other than 3LL) have been replaced FIG. 4B, a photograph shows a change in the image data before and after the color difference reduction processing. In the case of the image data following processing (left side), the color spot noise of the original image is conspicuously reduced. Furthermore, except for a slight running the lips of the doll at corners of the mouth, almost no deterioration in image quality is seen in the image following processing. Instead, to the extent that edge collapse caused by color spot noise is suppressed, an overall improvement is seen in the reproducibility of the image structure.

Figure 5A:
FIGS. 5A to 5C show an effect of reduction processing and emphasis processing of a brightness component according to the present invention.

In FIG. 5A, the high-band transformation coefficients (1HL, 1LH, 1HH) of the brightness component Y have all been replaced by zero for the image following color difference reduction processing. The rough high-band noise seen in the overall image is ameliorated. However, since a visual sensitivity of the brightness component Y is relatively high as compared to that of the color difference components CbCr, a conspicuous decrease in a sense of sharpness is seen in the image shown in FIG. 5A.

Figure 5B:

In FIG. 5B, the non-correlated component (1HH) of the brightness component Y has entirely been replaced by zero, and the vertical and the horizontal correlated components (1HL, 1LH) of the brightness component have been multiplied by a factor of 0.5. In the image shown in FIG. 5B, since the vertical and the horizontal correlated components that contain numerous signal components are allowed to remain to the maximum extent possible, the decrease in the sense of sharpness is favorably suppressed.

Figure 5C:

In FIG. 5C, intermediate-band components (2LH, 2HL, 2HH) of the image shown in FIG. 5B are reinforced by a factor of 1.5. In the image shown in FIG. 5C, the edge portions of the image are emphasized by a slight thickening, so that the sense of sharpness is emphasized.

Figure 6:
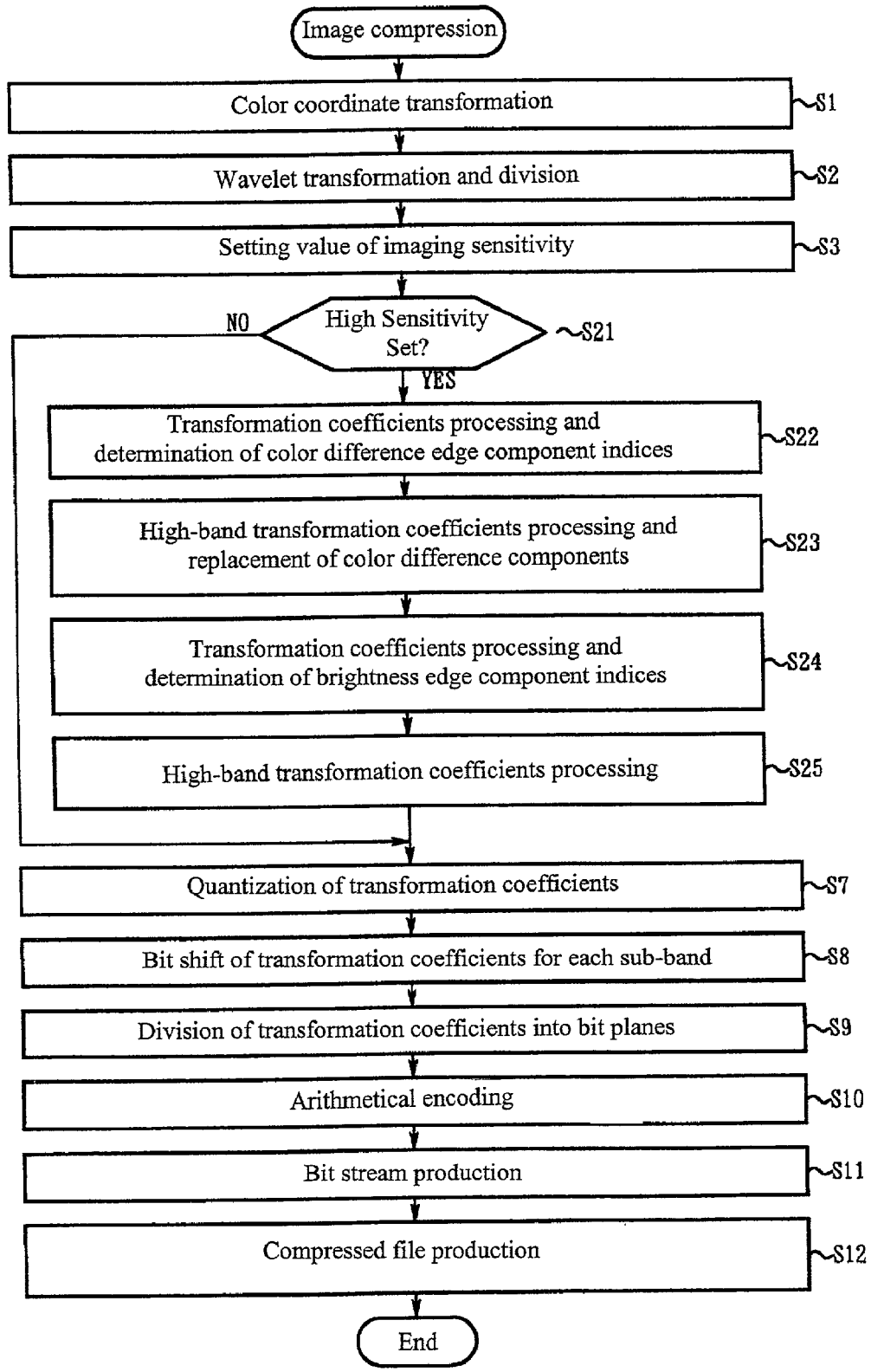
FIG. 6 is a flow chart showing an exemplary image compression processing according to the present invention.

FIG. 6 is a flow chart showing an exemplary image compression processing according to the present invention. In FIG. 6, Steps S4 through S6 shown in FIG. 2 are replaced by Steps S21 through S25.

In Step S21, a coefficient adjustment part 23 may make a determination if an imaging sensitivity or greater than a specified threshold value. In cases where the imaging sensitivity or greater than the threshold value, the coefficient adjustment part 23 may shift the processing operation to step S22. Conversely, in cases where the imaging sensitivity is less than the threshold value, the coefficient adjustment part 23 may shift the processing operation to step S7.

In Step S22, the coefficient adjustment part 23 may square the transformation coefficients of the bands (other than 3LL) corresponding to the edge portions (color boundaries) of the color difference components CbCr, and thus may determine color difference edge component indices (map information). In cases where the edge component indices are equal to or greater than a specified value, the regions may be viewed as color difference edge portions.

In Step S23, in regions within the image where the color difference edge component indices show a value that is less than a specified value, the high-band transformation coefficients (other than 3LL) of the color difference components CbCr may be replaced by values that are substantially zero.

In Step S24, the coefficient adjustment part 23 may square the transformation coefficients (3HL, 3LH, 3HH, 2HL, 2LH, 2HH) of the bands corresponding to the edge portions of the brightness component Y, and thus may determine brightness edge component indices (map information). In cases where these edge component indices are equal to or greater than a specified value, these regions may be viewed as the brightness edge portions.

In Step S25, in regions within the image where the brightness edge component indices show a value that is less than a specified value, the high-band transformation coefficients (1LH, 1HL, 1HH) of the brightness component Y may be replaced by values that are substantially zero.

Accordingly, as a result of the exemplary image compression processing according to the present invention, the high-band transformation coefficients of the edge portions may be selectively allowed to remain. As a result, smoothing out of the edge portions is prevented, so that the sense of sharpness of the image can be preserved.

Figure 7:
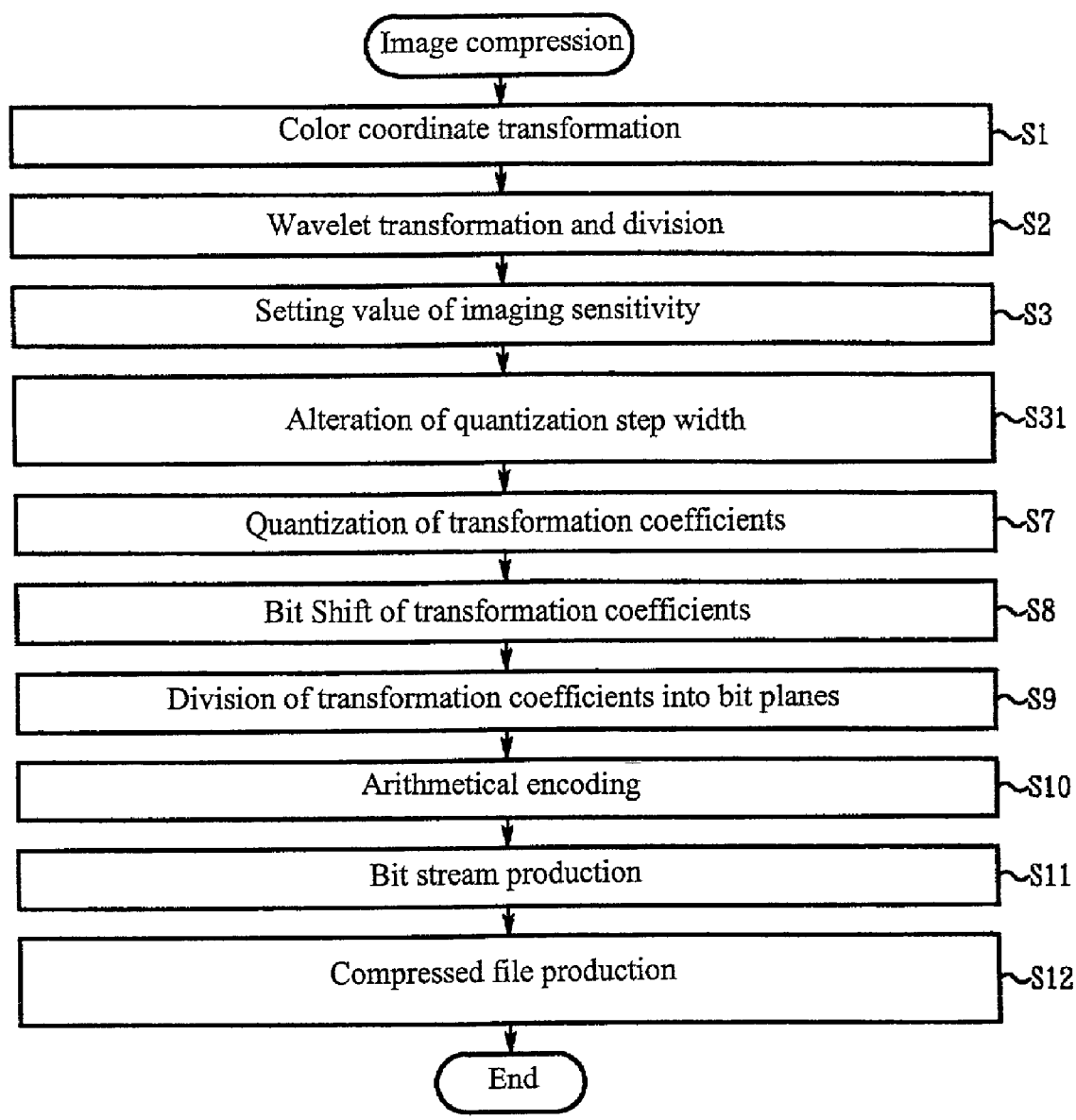
FIG. 7 is a flow chart showing another exemplary image compression processing according to the present invention.

FIG. 7 is a flow chart showing another exemplary image compression processing according to the present invention. A characteristic feature of the exemplary image compression processing is that the quantization step width of YCbCr may be varied based upon a setting of the imaging sensitivity (step S31 FIG. 7).

First, it may be assumed that the wavelet transformation coefficients have a Laplace distribution. In other words, the probability f(y) that the transformation coefficients will assume a value of y is assumed to be as follows:

$$f(y) = \frac{\alpha}{2} e^{-\alpha|y|} \qquad 1$$

In cases where such wavelet transformation coefficients are quantized with a quantization step width of Q, the probability $P_k$ that the $k^{th}$ quantized value may be assumed is as follows:

$$P_k = \int_{Q(k-1/2)}^{Q(k+1/2)} f(y) \, dy \qquad 2$$

In this case, the encoding rate R(Q) following quantization may be equal the entropy, whereby:

$$R(Q) = \qquad 3$$
$$-\sum_k p_k \log p_k = -\log(1 - e^{-\alpha Q/2}) + e^{-\alpha Q/2} \log \frac{2}{1 + e^{\alpha Q/2}} + \frac{\alpha Q}{2 \sinh \alpha \frac{Q}{2}}$$

Meanwhile, if the quantization distortion D(Q) is estimated as the second-power error, this may be expressed as follows:

$$D(Q) = \sum_k \int_{Q(k-1/2)}^{Q(k+1/2)} (y - kQ)^2 f(y) \, dy = \frac{2}{\alpha^2} + \frac{Q}{\alpha} e^{\alpha Q/2} + \frac{2Q \cosh \alpha \frac{Q}{2}}{\alpha(1 - e^{-\alpha Q})} \qquad 4$$

Here, the quantization step width of the $i^{th}$ sub-band is designated as $Q_i$, the encoding rate in this case is designated as $R_i(Q_i)$, and the quantization distortion is designated as $D_i(Q_i)$.

In setting the quantization step width $Q_i$, it may be desirable that the negative effect of the quantization distortion on the image quality may be minimized under the constraining condition of setting the sum of the encoding rates of the sub-bands at the target rate. Accordingly, the following function J may be created using a Lagrangian (undetermined) multiplier λ.

$$J = \sum_i \gamma_i D_i(R_i) + \lambda \sum_i R_i(Q_i) \qquad 5$$

In the equation of the function J, $\gamma_i$ is a value that indicates the negative effect of the quantization distortion $D_1$ of the ith sub-band on the image quality, and is a distortion weighting coefficient.

Under ordinary imaging conditions, it may be desirable that this distortion weighting coefficient $\gamma_i$ be determined in accordance with the visual sensory characteristics of a human being (visual frequency weight). On the other hand, under unusual imaging conditions in which noise is conspicuous, the noise may be masked by the quantization distortion $D_i$. Accordingly, a corresponding improvement in the image quality may be expected. In order to achieve a positive effect on the image quality, it may be desirable that the distortion weighting coefficient $\gamma_i$ be adjusted to a smaller value as the amount of noise in the ith sub-band increases.

As a result of such an adjustment of the distortion weighting coefficient $\gamma_i$, the difference in the imaging conditions such as the imaging sensitivity is reflected in the function J. Next, when the function J is partially differentiated by $R_i$, and a conditional equation in which the first term of the function J is a stationary value is determined, the following equation may be obtained:

$$\frac{\partial J}{\partial R_i} = \gamma_i \frac{dD_i}{dR_i} + \lambda = 0 \qquad 6$$

The following equation may then be obtained by transforming the equation:

$$\frac{dD_i}{dR_i} = \frac{dD_i}{dQ_i} \frac{dQ_i}{dR_i} = -\frac{\lambda}{\gamma_i} \qquad 7$$

The values of $Q_i$ for each sub-band may be determined by solving Equation 7 with an appropriate value of λ. On the basis of these $Q_i$ values, the total encoding rate $R_\lambda$ may be determined by the following calculation:

$$R_\lambda = \sum_i R_i(Q_i) \qquad 8$$

The final quantization step width $Q_i$ may be confirmed by the fine adjustment of the undetermined multiplier λ so that the encoding rate $R_\lambda$ agrees with the target encoding rate.

As described above, the quantization step width may be varied in accordance with the setting of the imaging sensitivity. Accordingly, in the case of imaging conditions under which there is a deterioration in the image S/N ratio, the noise component may be appropriately reduced by widening the quantization step width. In particular, the quantization step width $Q_i$ that is appropriate for each imaging sensitivity may be determined by adjusting the distortion weighting coefficient $\gamma_i$ in accordance with the setting of the imaging sensitivity. Accordingly, the quantization distortion $D_i$ of the signal components and the noise ameliorating effect may be favorably balanced.

Figure 8:
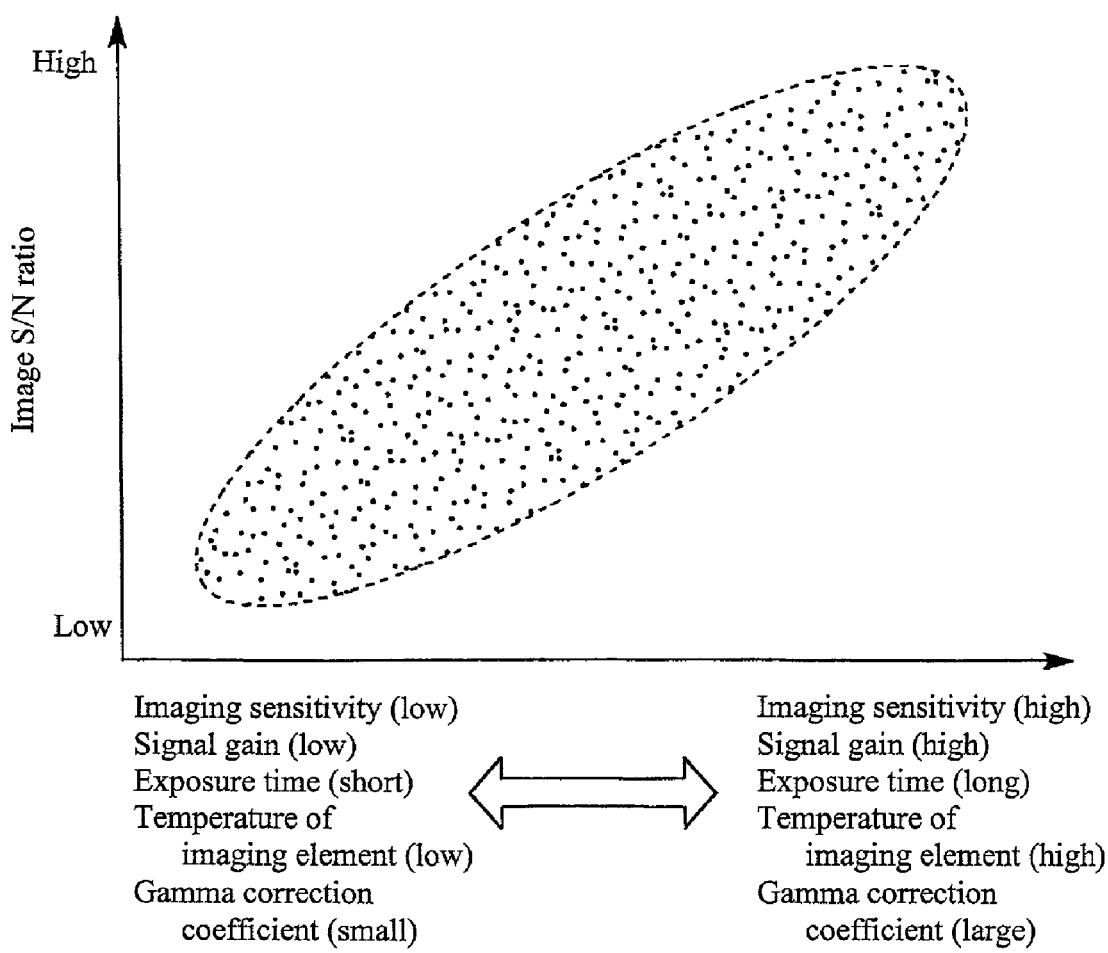
FIG. 8 is a graph showing a relationships between various imaging conditions and a S/N ratio of an image according to the present invention.

In the exemplary image compression processes described above, imaging sensitivity was used as an imaging condition. Such a case is advantageous in that appropriate image compression may be performed with sensitivity to changes in the amount of noise in the image data. However, the imaging conditions of the present invention are not limited to this. For example, other imaging conditions that have a correlation with the S/N ratio of the image may be considered. For example, signal gain of the imaging part, exposure time of the imaging part, element temperature of the imaging element, and gamma correction curve selection may be used, as is shown in FIG. 8.

In cases where the imaging sensitivity is set at a higher value than usual on the electronic camera side, there may be a high possibility that this will involve imaging under low illumination, so that there may be a high possibility of a deterioration in the S/N ratio of the image data. Accordingly, image compression that may be suited to the variation in the amount of noise may be accomplish imaging sensitivity condition.

In cases where the signal gain of the image signal is set at a higher value than usual on the electronic camera side, there may be a high possibility that this will involve imaging under low illumination, so that there may be a high possibility of a deterioration in the S/N ratio of the image data. Accordingly, image compression that may be suited to the variation in the amount of noise may be accomplished by using a signal gain condition.

In cases where the exposure time is set at a longer value than usual on the electronic camera side, there may be a high possibility that this will involve imaging under low illumination, so that there may be a high possibility of a deterioration in the S/N ratio of the image data. Accordingly, image compression that may be suited to the variation in the amount of noise can be accomplish exposure time condition.

When a temperature of the imaging element is higher than usual on the electronic camera side, the S/N ratio of the image data may deteriorate. Accordingly, image compression that may be suited to the variation in the amount of noise may be accomplished by using an element temperature condition.

In the case of the imaging condition, there may be a variation in the appearance of noise upon the image. In particular, as a gamma value increases, noise in dark portions floats upward in a bright manner and becomes conspicuous. Image compression suited to such a variation in noise may be accomplished.

Furthermore, the present invention is not limited to a single type of imaging condition. For example, a plurality of different types of imaging conditions may be used in combination. By using such a combination of conditions, it is possible to estimate the image S/N ratio more accurately, so that more appropriate image compression is possible.

Furthermore, in the exemplary image compression processes described above, a case was described in which the present invention was applied to an electronic camera. Such a case offers an advantage in terms of construction in that the imaging conditions of the image data can be immediately acquired from the electronic camera. However, the exemplary image compression processes according to the present invention are not limited to an electronic camera. For example, by converting the exemplary image compression processes shown in FIGS. 2, 6, and 7, for example, into a program code, it would also be possible to construct an image compression program.

Furthermore, the imaging conditions referred to herein do not necessary have to include any of the conditions of image compression such as compression size (so-called super-fine mode, fine mode or normal mode) or the state of the image data (space frequency spectrum of the image signal).

Furthermore, the image compression processes according to the present invention may be carried-out by a computer. For example, a computer-readable medium may contain a computer program, or code with functions for image compression in which a computer is caused to function as the above-described transformation part, coefficient adjustment part, and encoding part. Accordingly, the computer program may transform image data under specified imaging conditions to a frequency decomposition to determine transformation coefficients, adjust values of the transformation coefficients in accordance with information regarding the imaging conditions to determine adjusted values, and encode the adjusted values. The computer-readable medium may include various formats including a recording medium, such as a floppy diskette, magnetic tape, and compact disc, for example. The computer-readable medium may also include a wave-type format including a carrier wave.

Furthermore, the image compression processes according to the present invention may be carried-out by a computer system. The computer system may include a plurality of processing components for subjecting image data under specified imaging conditions to a frequency decomposition to determine transformation coefficients. In addition, the computer system may include a plurality of processing components for altering values of the transformation coefficients in accordance with information regarding the imaging conditions to determine altered values, and for encoding the altered values.

It will be apparent to those skilled in the art that various modifications and variations can be made in the image compression device, image compression method, electronic camera, and image compression program of the present invention without departing from the spirit or scope of the invention. Thus, it is intended that the present invention cover the modifications and variations of this invention provided they come within the scope of the appended claims and their equivalents.

What is claimed is:

1. An image compression device, comprising:
   a transformation part for subjecting image data to frequency decomposition and for determining transformation coefficients;
   a coefficient adjustment part for altering the transformation coefficients according to an imaging conditions of the image data, the imaging conditions are determined by an imaging conditions setting part of an electronic camera at a time when the image data is produced such that the coefficient adjustment part reduces high-band transformation coefficients of color difference components in accordance with a S/N ratio estimation of the image data estimated from the imaging conditions setting part; and an encoding part for encoding the altered transformation coefficients.

2. The device according to claim 1, wherein the coefficient adjustment part increases the transformation coefficients on a low-band side of the high-band transformation coefficients.

3. The device according to claim 1, wherein the coefficient adjustment part adjusts an amount of reduction of the high-band transformation coefficients in accordance with the transformation coefficients of bands corresponding to edge portions of the image data.

4. The device according to claim 1, wherein the coefficient adjustment part reduces the high-band transformation coefficients by replacing the high-band transformation coefficients having a predetermined amplitude with a value that is substantially zero.

5. The device according to claim 1, wherein the coefficient adjustment part reduces the high-band transformation coefficients by increasing a quantization step width of the high-band transformation coefficients.

6. An image compression device, comprising:
   a transformation part for subjecting image data to frequency decomposition and for determining transformation coefficients;
   a coefficient adjustment part for altering the transformation coefficients according to an imaging conditions of the image data, the imaging conditions are determined by an imaging conditions setting part of an electronic camera at a time when the image data is produced such that the coefficient adjustment part reduces high-band transformation coefficients of a brightness component in accordance with a S/N ratio estimation of the image data which is estimated from the imaging conditions setting part; and
   an encoding part for encoding the altered transformation coefficients.

7. The device according to claim 6, wherein the coefficient adjustment
   part increases the transformation coefficients on a low-band side of the high-band transformation coefficients.

8. The device according to claim 6, wherein the coefficient adjustment part adjusts an amount of reduction of the high-band transformation coefficients in accordance with the transformation coefficients of bands corresponding to edge portions of the image data.

9. The device according to claim 6, wherein the coefficient adjustment part reduces the high-band transformation coefficients by replacing the high-band transformation coefficients having a predetermined amplitude with a value that is substantially zero.

10. The device according to claim 6, wherein the coefficient adjustment part reduces the high-band transformation coefficients by increasing a quantization step width of the high-band transformation coefficients.

11. A method for image compression, comprising the steps of:
    subjecting image data to frequency decomposition and for determining transformation coefficients;
    altering the transformation coefficients according to imaging conditions of the image data, the imaging conditions are determined by an imaging conditions setting part of an electronic camera at a time when the image data is produced such that the step of altering the transformation coefficients includes reducing high-band transformation coefficients of color difference components in accordance with a S/N ratio estimation of the image data which is estimated from the imaging conditions setting part; and
    encoding the altered transformation coefficients.

12. The method according to claim 11, wherein the step of altering the transformation coefficients includes increasing the transformation coefficients on a low-band side of the high-band transformation coefficients.

13. The method according to claim 11, wherein the step of altering the transformation coefficients includes adjusting an amount of reduction of the high-band transformation coefficients in accordance with the transformation coefficients of bands corresponding lo edge portions of the image data.

14. The method according to claim 11, wherein the step of altering the transformation coefficients includes reducing the high-band transformation coefficients by replacing the high-band transformation coefficients having a predetermined amplitude with a value that is substantially zero.

15. The method according to claim 11, wherein the step of altering the transformation coefficients includes reducing the high-band transformation coefficients by increasing a quantization step width of the high-band transformation coefficients.

16. A method for image compression, comprising the steps of:
    subjecting image data to frequency decomposition and for determining transformation coefficients;
    altering the transformation coefficients according to imaging conditions of the image data, the imaging conditions are determined by an imaging conditions setting part of an electronic camera at a time when the image data is produced such that the step of altering the transformation coefficients includes reducing high-band transformation coefficients of a brightness component in accordance with a S/N ratio estimation of the image data which is estimated from the imaging conditions setting part; and
    encoding the altered transformation coefficients.

17. The method according to claim 16, wherein the step of altering the transformation coefficients includes increasing the transformation coefficients on a low-band side of the high-band transformation coefficients.

18. The method according to claim 16, wherein the step of altering the transformation coefficients includes adjusting an amount of reduction of the high-band transformation coefficients in accordance with the transformation coefficients of bands corresponding to edge portions of the image data.

19. The method according to claim 16, wherein the step of altering the transformation coefficients includes reducing the high-band transformation coefficients by replacing the high-band transformation coefficients having a predetermined amplitude with a value that is substantially zero.

20. The method according to claim 16, wherein the step of altering the transformation coefficients includes reducing the high-band transformation coefficients by increasing a quantization step width of the high-band transformation coefficients.

21. An electronic camera device, comprising:
an image compression device including a transformation part, a coefficient adjustment part, and an encoding part;
an imaging part for producing image data by imaging an object of imaging;
an imaging conditions setting part for determining image conditions of the image data at a time when the image data is produced, the image compression device acquires the imaging conditions, and subjects the image data to image compression according to the acquired imaging conditions, wherein
the transformation part subjects the image data to frequency decomposition and determines transformation coefficients, the coefficient adjustment part alters the transformation coefficients by reducing high-band transformation coefficients of color difference components in accordance with a S/N ratio estimation of the image data estimated from the imaging conditions setting part, and the encoding part encodes altered transformation coefficients.

22. The camera device according to claim 21, wherein the coefficient adjustment part increases the transformation coefficients on a low-band side of the high-band transformation coefficients.

23. The camera device according to claim 21, wherein the coefficient adjustment part adjusts an amount of reduction of the high-band transformation coefficients in accordance with the transformation coefficients of bands corresponding to edge portions of the image data.

24. The camera device according to claim 21, wherein the coefficient adjustment part reduces the high-band transformation coefficients by replacing the high-band transformation coefficients having a predetermined amplitude with a value that is substantially zero.

25. The camera device according to claim 21, wherein the coefficient adjustment part reduces the high-band transformation coefficients by increasing a quantization step width of the high-band transformation coefficients.

26. An electronic camera device, comprising:
an image compression device including a transformation part, a coefficient adjustment part, and an encoding part;
an imaging part for producing image data by imaging an object of imaging;
an imaging conditions setting part for determining image conditions of the image data at a time when the image data is produced, the image compression device acquires the imaging conditions, and subjects the image data to image compression according to the acquired imaging conditions, wherein
the transformation part subjects the image data to frequency decomposition and determines transformation coefficients, the coefficient adjustment part alters the transformation coefficients by reducing high-band transformation coefficients of a brightness component in accordance with a S/N ration estimation of the image data estimated from the imaging conditions setting part, and the encoding part encodes altered transformation coefficients.

27. The camera device according to claim 26, wherein the coefficient adjustment part increases the transformation coefficients on a low-band side of the high-band transformation coefficients.

28. The camera device according to claim 26, wherein the coefficient adjustment part adjusts an amount of reduction of the high-band transformation coefficients in accordance with the transformation coefficients of bands corresponding to edge portions of the image data.

29. The camera device according to claim 26, wherein the coefficient adjustment part reduces the high-band transformation coefficients by replacing the high-band transformation coefficients having a predetermined amplitude with a value that is substantially zero.

30. The camera device according to claim 26, wherein the coefficient adjustment part reduces the high-band transformation coefficients by increasing a quantization step width of the high-band transformation coefficients.

31. A computer-readable medium having a computer program with functions for image compression, by performing the steps of:
subjecting image data under specified imaging conditions, in which the specified imaging conditions are determined by an imaging conditions setting part of an electronic camera at a time when the image data is produced, to a frequency decomposition to determine transformation coefficients;
altering values of the transformation coefficients in accordance with the specified imaging conditions, the step of altering comprises the step of reducing high-band transformation coefficients of color difference components in accordance with a S/N ratio estimation of the image data estimated from the imaging conditions setting part;
determining the altered values; and
encoding the altered values.

32. The computer-readable medium according to claim 31, wherein the step of altering further comprises the step of increasing the transformation coefficients on a low-band side of the high-band transformation coefficients.

33. The computer-readable medium according to claim 31, wherein the step of altering further comprises the step of adjusting an amount of reduction of the high-band transformation coefficients in accordance with the transformation coefficients of bands corresponding to edge portions of the image data.

34. The computer-readable medium according to claim 31, wherein the step of altering further comprises the step of reducing the high-band transformation coefficients by replacing the high-band transformation coefficients having a predetermined amplitude with a value that is substantially zero.

35. The computer-readable medium according to claim 31, wherein the step of altering further comprises the step of reducing the high-band transformation coefficients by increasing a quantization step width of the high-band transformation coefficients.

36. A computer-readable medium having a computer program with functions for image compression, by performing the steps of:
subjecting image data under specified imaging conditions, in which the specified imaging conditions are determined by an imaging conditions setting part of an electronic camera at a time when the image data is produced, to a frequency decomposition to determine transformation coefficients;
altering values of the transformation coefficients in accordance with the specified imaging conditions, the step of altering further comprises the step of reducing the high-band transformation coefficients of a brightness component in accordance with a S/N ratio estimation of the image data estimated from the imaging conditions setting part;
determining the altered values; and
encoding the altered values.

37. The computer-readable medium according to claim 36, wherein the step of altering further comprises the step of increasing the transformation coefficients on a low-band side of the high-band transformation coefficients.

38. The computer-readable medium according to claim 36, wherein the step of altering further comprises the step of adjusting an amount of reduction of the high-band transformation coefficients in accordance with the transformation coefficients of bands corresponding to edge portions of the image data.

39. The computer-readable medium according to claim 36, wherein the
step of altering further comprises the step of reducing the high-band transformation coefficients by replacing the high-band transformation coefficients having a predetermined amplitude with a value that is substantially zero.

40. The computer-readable medium according to claim 36, wherein the
step of altering further comprises the step of reducing the high-band transformation coefficients by increasing a quantization step width of the high-band transformation coefficients.

41. An image compression device, comprising:
a transformation part for subjecting image data to frequency decomposition and for determining transformation coefficients;
a coefficient adjustment part for altering the transformation coefficients according to temperature of an imaging element of an electronic camera device for obtaining the image data; and
an encoding part for encoding the altered transformation coefficients.

42. An image compression device, comprising:
a transformation part for subjecting image data to frequency decomposition and for determining transformation coefficients;
a coefficient adjustment part for altering the transformation coefficients according to a gamma correction curve selection of a signal processing part of an electronic camera device for obtaining the image data; and
an encoding part for encoding the altered transformation coefficients.

43. A method for image compression, comprising the steps of:
subjecting image data to frequency decomposition and for determining transformation coefficients;
altering the transformation coefficients according to temperature of an imaging element of an electronic camera device for obtaining the image; and
encoding the altered transformation coefficients.

44. A method for image compression, comprising the steps of:
subjecting image data to frequency decomposition and for determining transformation coefficients;
altering the transformation coefficients according to a gamma correction curve selection of a signal processing part of an electronic camera device for obtaining the image; and
encoding the altered transformation coefficients.

45. A computer-readable medium having a computer program with functions for image compression, by performing the steps of:
subjecting image data under specified temperature of an imaging element of an electronic camera device to a frequency decomposition to determine transformation coefficients;
altering values of the transformation coefficients in accordance with information regarding the temperature of an imaging element to determine altered values; and
encoding the altered values.

46. A computer-readable medium having a computer program with function for image compression, by performing the steps of:
subjecting image data under specified gamma correction curve selection of a signal processing part of an electronic camera device to a frequency decomposition to determine transformation coefficients;
altering values of the transformation coefficient in accordance with information regarding the gamma correction curve selection to determine altered values; and
encoding the altered values.

* * * * *